3,320,239
CERTAIN 2,3-BIS(SUBSTITUTED AMINO)-5-ARYL-3H-1,4-BENZODIAZEPINE-4-OXIDE COMPOUNDS AND THEIR PREPARATION
Arthur Stempel, Teaneck, and Leo Henryk Sternbach, Upper Montclair, N.J., assignors to Hoffmann-La Roche Inc., Nutley, N.J., a corporation of New Jersey
No Drawing. Filed Mar. 22, 1965, Ser. No. 441,863
7 Claims. (Cl. 260—239)

The present invention relates to novel chemical compounds and to novel processes for preparing such novel chemical compounds. More particularly, the present invention relates to novel chemical compounds which can be characterized broadly in a chemical sense as being 2,3-bis(amino)-1,4-benzodiazepines and to novel chemical processes for preparing such 2,3-bis(amino)-1,4-benzodiazepines.

The novel chemical compounds of the present invention are compounds of the formula

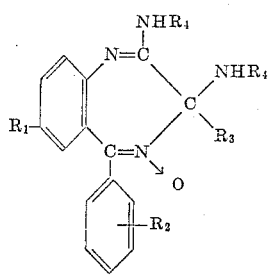

(I)

wherein $R_1$ and $R_2$ are each selected from the group consisting of hydrogen, halogen, nitro and trifluoromethyl; $R_3$ is selected from the group consisting of hydrogen and lower alkyl; and $R_4$ is selected from the group consisting of lower alkyl, lower alkenyl, lower alkynyl, benzyl, substituted benzyl, $C_3$–$C_7$ cycloalkyl and

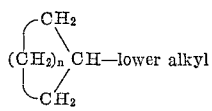

wherein $n$ is a whole integer from 0–4.

The term "lower alkyl" as used throughout the present disclosure connotes both straight and branched chain hydrocarbon groups having 1–7 carbon atoms in the chain such as methyl, ethyl, n-propyl, isopropyl, butyl and the like. The term "halogen" employed throughout the present disclosure encompasses all four forms thereof, i.e., chlorine, fluorine, bromine and iodine unless otherwise specified. The expression "substituted benzyl" represents a group such as an α-lower alkyl-benzyl group, a benzyl group having halo or lower alkyl on the phenyl nucleus and the like. Thus, by this expression, a benzyl group having substitutents on the phenyl portion and/or on the lower alkyl portion thereof is intended. Representative of $C_3$–$C_7$ cycloalkyl groups are cyclopentyl, cyclohexyl and the like. By the term "lower alkenyl," there is comprehended allyl, propenyl and the like. The term "lower alkynyl" designates 1-propynyl, 2-propynyl and the like.

Preferred are compounds of Formula I above wherein $R_4$ is lower alkyl. Most preferred are compounds of the Formula I above wherein $R_4$ is lower alkyl and $R_3$ is hydrogen.

Compounds corresponding to Formula I above can be prepared by reacting a compound of the formula

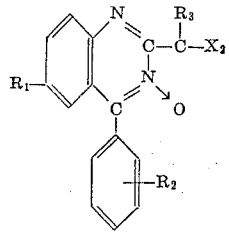

(II)

wherein $R_1$, $R_2$ and $R_3$ are as above and X is halogen, preferably selected from the group consisting of bromine and chlorine with any suitable primary amine, preferably, one of the formula $R_4NH_2$ wherein $R_4$ is as above.

Any suitable primary amine may be utilized in preparing compounds of Formula I above. For example, ethylamine, methylamine, propylamine, tertiary butylamine, allylamine, benzylamine, α-methyl benzylamine, cyclohexylamine and 4-halo-benzylamine, among others, may be utilized for this purpose. It is, of course, to be understood that the hereinabove enumerated list of compounds is only exemplary and is by no means complete.

Also included within the purview of the present invention are compounds of the formula

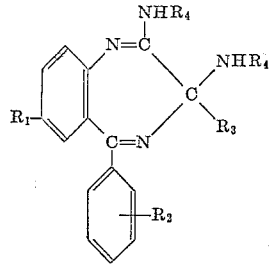

(III)

wherein $R_1$ and $R_2$ are each selected from the group consisting of hydrogen, halogen, nitro and trifluoromethyl; $R_3$ is selected from the group consisting of hydrogen and lower alkyl and $R_4$ is selected from the group consisting of lower alkyl, lower alkenyl, lower alkynyl, benzyl, substituted benzyl, $C_3$–$C_7$ cycloalkyl and

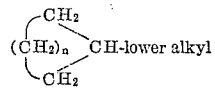

wherein $n$ is a whole integer from 0–4.

Such compounds can be prepared by the catalytic hydrogenation of compounds of the Formula I above whereby to remove the N-oxide group therefrom. For example, compounds of Formula III above can be prepared by the reduction of compounds of Formula I above with hydrogen in the presence of any suitable hydrogenation catalyst such as Raney nickel.

The preparation of compounds having the Formula I above from the corresponding compounds having the Formula II above can be effected at room temperature and atmospheric pressure or below or above room temperature and/or elevated pressures. As can be seen from the above, temperature and pressure are not critical and any suitable temperature which will effect the desired end is included within the purview of the present invention. The primary amine per se, e.g. compounds of the formula R₄NH₂, can serve as the medium in which the preparation of compounds of Formula I above from the corresponding compounds of Formula II above is effected. Alternatively, the reaction can be run in any suitable inert organic solvent. Among the inert organic solvents usable for this purpose may be included lower alkanols, such as methanol and ethanol, ethers such as dioxane, tetrahydrofuran, dimethylformamide and the like.

The novel medicinally valuable compounds of this invention conforming to Formula I above and Formula III above are useful as anticonvulsants and muscle relaxants. They can be administered internally, for example, orally or parenterally, with dosage adjusted to fit the exigencies of a particular therapeutic situation. They can be compounded into conventional dosage forms to provide suppositories, suspensions, solutions, capsules, tablets and the like.

The following examples are illustrative but not limitative of the invention. All temperatures are stated in degrees centigrade unless otherwise indicated.

EXAMPLE 1

A solution of 12.3 g. (36.3 mmols) of 6-chloro-2-dichloromethyl-4-phenyl-quinazoline 3-oxide in 500 ml. of a 15% solution of methylamine in methanol was kept at room temperature for 16 hours. The reaction mixture was concentrated to dryness in vacuo and the residue partitioned between methylene chloride and water. The organic layer was separated, washed with water, dried over sodium sulfate and the solvent then distilled off. Crystallization of the residue from a mixture of methylene chloride and hexane gave 7-chloro-2,3-bis(methylamino)-5-phenyl-3H-1,4-benzodiazepine 4-oxide melting at 142–146°. Recrystallization from acetonitrile gave the product melting at 150–151°. The compound was polymorphic and crystallized as needles or prisms both having the same melting point.

EXAMPLE 2

A solution of 10 g. (29.4 mmols.) of 6-chloro-2-dichloromethyl-4-phenyl-quinazoline 3-oxide in 450 ml. of a 14% solution of ethylamine in methanol was kept at room temperature for 16 hours. The reaction mixture was then concentrated to dryness in vacuo and the residue partitioned between methylene chloride and water. The methylene chloride layer was separated, washed with water, dried over sodium sulfate and concentrated to dryness in vacua. The residue crystallized on stirring with ether yielding 7-chloro-2,3-bis(ethylamino)-5-phenyl-3H-1,4-benzodiazepine 4-oxide melting at 152–3°. Recrystallization from acetonitrile gave light yellow prisms melting at 152–3°.

EXAMPLE 3

A solution of 5.0 g. (14.7 mm.) of 6-chloro-2-dichloromethyl-4-phenylquinazoline 3-oxide in 250 ml. of liquid ethylamine was stirred at reflux temperature (16–17°) for 18 hours. Ethylamine was then distilled off and the residue dissolved in methylene chloride. The resulting solution was then washed with water, dried over sodium sulfate and the solvent distilled off. The residue was crystallized from acetonitrile yielding 7-chloro-2,3-bis(ethylamino)-5-phenyl-3H-1,4-benzodiazepine 4-oxide melting at 152–153° dec.

EXAMPLE 4

A solution of 19.1 g. (0.178 mole) of cyclopropylmethylamine hydrochloride in 300 ml. of methanol was cooled in an ice bath. 9.6 g. (0.178 mole) of sodium methoxide dissolved in 50 ml. of methanol was added slowly to the so-cooled solution. After 10 min., 10 g. (0.029 mole) of 6-chloro-2-dichloromethyl-4-phenylquinazoline 3-oxide were added. The reaction mixture was stirred thereafter for 20 hours at room temperature and the insoluble material which formed was filtered off. The methanol filtrate was concentrated to dryness in vacuo and the residue partitioned between methylene chloride and water. The organic layer was separated, dried over sodium sulfate and concentrated to dryness. The residue crystallized from a mixture of benezene and hexane to give 7-chloro-2,3-bis(cyclopropylmethylamino)-5-phenyl-3H-1,4-benodiazepine 4-oxide melting at 155–156°.

EXAMPLE 5

A mixture of 10 g. of 6-chloro-2-dichloromethyl-4-phenylquinazoline 3-oxide, 33 ml. of benzylamine and 750 ml. of methanol were stirred for 20 hours at room temperature and then at 40° for 1 hour. The solution thus obtained was concentrated to about 200 ml. in vacuo and the crystalline material that formed was filtered off. The filtrate was evaporated to dryness in vacuo and the residue partitioned between methylene chloride and water. The organic layer was separated, dried over sodium sulfate, filtered, and taken to dryness. Crystallization of the residue from acetonitrile yielded 2,3-bis(benzylamino) - 7 - chloro - 5 - phenyl - 3H - 1,4 - benzodiazepine 4-oxide as clusters of needles melting at 133.5–136°. Further crystallization gave a pure product melting at 135–138°.

EXAMPLE 6

To a suspension of 10 g. (29.5 mmoles) of 6-chloro-2-dichloromethyl-4-phenylquinazoline 3-oxide in 400 ml. of methanol, there was added 25 g. (295 mmoles) of cyclopentylamine. The resultant mixture was stirred for 20 hours at room temperature and then filtered. The filtrate was concentrated to dryness in vacuo. The residue was added to 100 ml. of methylene chloride and the resultant mixture was stirred and then filtered. The filtrate was concentrated to dryness and the residue extracted with refluxing hexane. A crystalline material separated from the hexane. Recrystallization of the crystalline material from acetonitrile gave 7 - chloro - 2,3 - bis(cyclopenylamino)-5-phenyl-3H-1,4-benzodiazepine 4-oxide melting at 172–173° dec. Further crystallization from ethyl acetate gave the product melting at 175–176° dec.

EXAMPLE 7

A mixture of 10 g. (29.5 mmoles) of 6-chloro-2-dichloromethyl-4-phenylquinazoline 3-oxide and 29.3 gms. (295 mmoles) of cyclohexylamine in 400 ml. of methanol was stirred and refluxed for 3 hours. After chilling in an ice bath, the mixture was filtered. The filtrate was concentrated to dryness and the residue then stirred with 100 ml. of methylene chloride. The so-stirred medium was filtered and the methylene chloride filtrate was concentrated to dryness. The residue was extracted with hot hexane. On concentration of the hexane extract, crystals formed which were separated by filtration. The crystalline material was found to be 7-chloro-2,3-bis-(cyclohexylamino) - 5 - phenyl - 3H - 1,4 - benzodiazepine 4-oxide melting at 139–143° dec. Upon recrystallization from ethyl acetate, the product was found to have a melting point of 149–151° dec.

EXAMPLE 8

A solution of 6 g. (17.5 mmoles) of 2-dichloromethyl-6-nitro-4-phenylquinazoline 3-oxide in 150 ml. of 14% methylamine in methanol was kept at room temperature for a period of 20 hours. 2,3-bis(methylamino)-7-nitro-5-phenyl-3H-1,4-benzodiazepine 4-oxide precipitated as yellow crystals and was separated by filtration. It melted at 160–164° dec. Recrystallization from acetonitrile gave yellow rods of the product melting at 161–162° dec.

EXAMPLE 9

A solution of 4.5 g. (0.012 moles) of 2-dichloromethyl-4-phenyl-6-trifluoromethylquinazoline 3-oxide in 100 ml. of a 14% solution of methylamine in methanol was stirred overnight at room temperature. The reaction mixture was concentrated to about one half the volume.

The crystalline product that separated was filtered off and was found to be 2,3-bis(methylamino)-5-phenyl-7-trifluoromethyl-3H-1,4-benzodiazepine 4-oxide melting at 160–161°. Recrystallization from a mixture of methanol and water gave light yellow plates melting at 162–163°.

EXAMPLE 10

A solution of 10 g. of 6-chloro-2-dichloromethyl-4-phenylquinazoline 3-oxide in 250 ml. of isopropylamine after standing at room temperature for 60 hrs. was filtered. The filtrate was concentrated to dryness under reduced pressure. The residue was added to 200 ml. of methylene chloride and stirred. The so-stirred mixture was filtered and the filtrate then concentrated to a small volume. On addition of hexane, 7-chloro-2,3-bis(isopropylamino)-5-phenyl-3H-1,4-benzodiazepine 4 - oxide, melting at 167–168.5°, crystallized.

EXAMPLE 11

To a suspension of 10 g. (29.4 mmols.) of 6-chloro-2-dichloromethyl-4-phenylquinazoline 3-oxide in 200 ml. of methanol, 8.75 ml. (6.4 g., 88.5 mmols.) of n-butylamine was added. The reaction medium was stirred for 24 hours at room temperature and, thereafter, filtered. The filtrate was concentrated to dryness in vacuo and the residue partitioned between ether and water. The water layer was re-extracted with benzene and the organic layers combined and washed with water. After drying over sodium sulfate, the solvent was distilled off in vacuo. The residue crystallized when stirred with acetonitrile to give 2,3-bis (butylamino)-7-chloro-5-phenyl-3H-1,4-benzodiazepine 4-oxide melting at 137–9°. Recrystallization from acetonitrile gave straw colored prisms melting at 142–144°.

EXAMPLE 12

A tablet dosage form was prepared containing the following ingredients.

| Ingredient: | Per tablet, mg. |
|---|---|
| 7 - chloro - 2,3-bis(methylamino) - 5 - phenyl-3H-1,4-benzodiazepine 4-oxide | 5.0 |
| Lactose | 113.5 |
| Corn starch | 70.5 |
| Pregelatinized corn starch | 8.0 |
| Calcium stearate | 3.0 |
| Total weight | 200.0 |

The procedure for preparing the tablet dosage form was as follows: 7-chloro-2,3-bis(methylamino)-5-phenyl-3H-1,4-benzodiazepine 4-oxide, the lactose, the corn starch and the pregelatinized corn starch were mixed in a suitable size mixer. The resultant mixture was passed through a Fitzpatrick Comminuting Machine fitted with #1A screen and with knives forward. The mixture was then returned to the mixer and moistened with water to a thick paste. The moist mass was passed through a #12 screen, and the moist granules dried on paper lined trays at 110° F. The dried granules were returned to the mixer, the calcium stearate added and the resultant mass mixed well. The granules were compressed at a tablet weight of 200 mg., using standard concave punches having a diameter of 5/16″.

EXAMPLE 13

A suppository dosage formulation was prepared containing the following ingredients.

| Ingredient: | Per 1.3 gm. suppository, gm. |
|---|---|
| 7 - chloro - 2,3-bis(methylamino) - 5 - phenyl-3H-1,4-benzodiazepine 4-oxide | 0.010 |
| Wecobee M [1] | 1.245 |
| Carnauba wax | 0.045 |

[1] A refined synthetic cocoa butter, coconut derived. Available commercially from F. F. Drew Company, New York, N.Y.

The procedure for preparing the suppository dosage form was as follows: the Wecobee M and carnauba wax were melted in a suitable size glass lined container, mixed well and cooled to 45°. 7-chloro-2,3-bis(methylamino)-5-phenyl-3H-1,4-benzodiazepine 4-oxide, which has been reduced to a fine powder with no lumps, was added and stirred until completely and uniformly dispersed. The mixture was then poured into suppository molds to yield suppositories having an individual weight of 1.3 gms. The suppositories were cooled and removed from the molds.

EXAMPLE 14

A capsule dosage formulation was prepared containing the following ingredients.

| Ingredient: | Per capsule, mg. |
|---|---|
| 7 - chloro - 2,3 - bis(methylamino) - 5 - phenyl-3H-1,4-benzodiazepine 4-oxide | 10 |
| Lactose | 158 |
| Corn starch | 37 |
| Talc | 5 |
| Total weight | 210 |

The procedure for preparing the capsule dosage formulation was as follows: the 7-chloro-2,3-bis(methylamino)-5-phenyl-3H-1,4-benzodiazepine 4-oxide, the lactose and the corn starch were mixed in a suitable mixer. The resultant mixture was further blended by passing it through a Fitzpatrick Comminuting Machine with a #1A screen with knives forward. The blended power was returned to the mixer, and the talc added and blended thoroughly. The mixture was then filled into #4 hard shell gelatin capsules on a Parke Davis capsulating machine.

We claim:
1. A compound selected from the group consisting of compounds of the formula

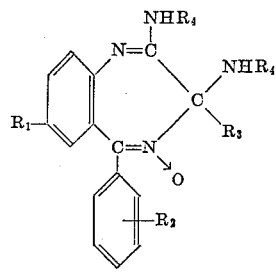

wherein $R_1$ and $R_2$ are selected from the group consisting of hydrogen, halogen, nitro and trifluoromethyl; $R_4$ is selected from the group consisting of hydrogen and lower alkyl; and $R_4$ is selected from the group consisting of lower alkyl, benzyl, lower alkenyl, lower alkynyl, $C_3$–$C_7$ cycloalkyl and

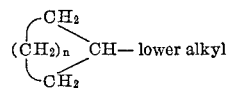— lower alkyl wherein $n$ is a whole integer from 0–4.

2. 7 - halo - 2,3-bis(lower alkyl amino)-5-phenyl-3H-1,4-benzodiazepine 4-oxide.

3. 7 - halo - 2,3-bis($C_3$-$C_7$-cycloalkyl amino)-5-phenyl-3H-1,4-benzodiazepine 4-oxide.

4. 7 - halo - 2,3 - bis(benzylamino)-5-phenyl-3H-1,4-benzodiazepine 4-oxide.

5. 7 - nitro - 2,3 - bis(lower alkyl amino)-5-phenyl-3H-1,4-benzodiazepine 4-oxide.

6. 7 - trifluoromethyl - 2,3-bis(lower alkyl amino)-5-phenyl-3H-1,4-benzodiazepine 4-oxide.

7. A process which comprises reacting a compound of the formula

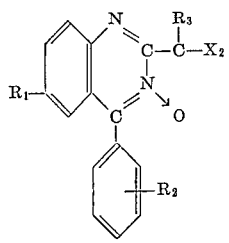

wherein $R_1$ and $R_2$ are selected from the group consisting of hydrogen, halogen, nitro and trifluoromethyl; $R_3$ is selected from the group consisting of hydrogen and lower alkyl and X is a halogen with a primary amine of the formula $$R_4NH_2$$

wherein $R_4$ is selected from the group consisting of lower alkyl, lower alkenyl, lower alkynyl, benzyl, C3–C7 cycloalkyl and

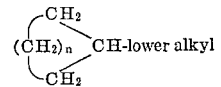

wherein $n$ is a whole integer from 0–4.

No references cited.

ALEX MAZEL, *Primary Examiner.*
ALTON D. ROLLINS, *Examiner.*